(12) United States Patent
Fogel et al.

(10) Patent No.: US 8,175,734 B2
(45) Date of Patent: May 8, 2012

(54) METHODS AND SYSTEM FOR ENABLING PRINTING THREE-DIMENSIONAL OBJECT MODELS

(75) Inventors: Effi Fogel, Tel Aviv (IL); Arik Maman Adler, Ganot (IL); Zohar Basil, Tel Aviv (IL)

(73) Assignee: 3D M. T. P. Ltd., Tel Aviv (IL)

( * ) Notice: Subject to any disclaimer, the term of this patent is extended or adjusted under 35 U.S.C. 154(b) by 286 days.

(21) Appl. No.: 12/575,919

(22) Filed: Oct. 8, 2009

(65) Prior Publication Data
US 2011/0087350 A1     Apr. 14, 2011

(51) Int. Cl.
G06F 19/00 (2006.01)
G06F 17/50 (2006.01)

(52) U.S. Cl. ............... 700/98; 700/119; 700/182; 703/1

(58) Field of Classification Search ............. 700/97, 700/98, 117, 118, 119, 120, 180, 182; 264/401; 345/420; 703/1; 118/305
See application file for complete search history.

(56) References Cited

U.S. PATENT DOCUMENTS

| | | | |
|---|---|---|---|
| 5,182,715 A | 1/1993 | Vorgitch et al. | |
| 5,184,307 A | 2/1993 | Hull et al. | |
| 5,493,671 A | 2/1996 | Pitt et al. | |
| 5,596,504 A | 1/1997 | Tata et al. | |
| 5,610,824 A | 3/1997 | Vinson et al. | |
| 5,705,117 A | 1/1998 | O'Connor et al. | |
| 5,737,609 A | 4/1998 | Reed et al. | |
| 5,886,702 A | 3/1999 | Migdal et al. | |
| 5,923,573 A | 7/1999 | Hatanaka | |
| 5,973,697 A | 10/1999 | Berry et al. | |
| 6,180,186 B1 | 1/2001 | Choy et al. | |
| 6,362,833 B2 | 3/2002 | Sanjeev | |
| 6,401,001 B1 | 6/2002 | Jang et al. | |
| 6,623,687 B1 | 9/2003 | Gervasi et al. | |
| 6,748,419 B2 | 6/2004 | Grayson et al. | |
| 6,819,966 B1 | 11/2004 | Haeberli | |
| 7,027,887 B2 * | 4/2006 | Gaylo et al. ................ 700/117 |
| 7,050,876 B1 * | 5/2006 | Fu et al. ...................... 700/118 |
| 7,291,364 B2 | 11/2007 | Faulkner et al. | |

(Continued)

FOREIGN PATENT DOCUMENTS

EP     1 024 459 A2     8/2000

(Continued)

OTHER PUBLICATIONS

Berberich et. al., "Arrangements on Parametric Surfaces II: Concretizations and Applications", Mathematics in Computer Science, pp. 1-25 (2009).

Giannatsis et al., "Architectural scale modeling using stereolithography", Rapid Prototyping Journal, vol. 8, No. 3, pp. 200-207 (2002) ISSN: 1355-2546.

(Continued)

Primary Examiner — Charles Kasenge
(74) Attorney, Agent, or Firm — Browdy and Neimark, PLLC

(57) ABSTRACT

The present invention relates to a system and method of transforming an inconsistent 3D (three-dimensional) model of one or more 3D objects into a valid printable 3D model, said method comprising: (a) receiving an input model file and/or receiving modeler data, giving rise to an input 3D model having one or more parts; (b) analyzing said input 3D model and removing its one or more inconsistencies; (c) thickening the one or more parts of said 3D model, while preserving their functionality; and (d) unifying the union of interior volumes of said one or more parts, thereby removing self intersections and/or intersections between the two or more parts, giving rise to a valid printable 3D model.

20 Claims, 8 Drawing Sheets

U.S. PATENT DOCUMENTS

| | | | |
|---|---|---|---|
| 7,328,080 B2 * | 2/2008 | Fu et al. | 700/118 |
| 7,343,216 B2 | 3/2008 | Swift | |
| 7,583,272 B2 | 9/2009 | Ramani et al. | |
| 7,600,999 B2 * | 10/2009 | Knopp | 433/24 |
| 7,604,768 B2 * | 10/2009 | Kritchman | 264/401 |
| 7,628,857 B2 * | 12/2009 | Kritchman et al. | 118/305 |
| 7,658,976 B2 * | 2/2010 | Kritchman | 427/427.3 |
| 7,958,841 B2 * | 6/2011 | Kritchman et al. | 118/305 |
| 2002/0000996 A1 | 1/2002 | Sanjeev | |
| 2003/0109784 A1 | 6/2003 | Loh et al. | |
| 2003/0222921 A1 | 12/2003 | Rummel | |
| 2005/0038549 A1 | 2/2005 | Loughran et al. | |
| 2006/0114252 A1 | 6/2006 | Ramani et al. | |
| 2006/0250621 A1 | 11/2006 | Cochran et al. | |
| 2007/0013724 A1 | 1/2007 | Swift | |
| 2007/0206007 A1 | 9/2007 | Taubin | |
| 2007/0233975 A1 | 10/2007 | Mori et al. | |
| 2007/0291029 A1 | 12/2007 | Konev et al. | |
| 2008/0015947 A1 | 1/2008 | Swift | |
| 2008/0180440 A1 | 7/2008 | Stich | |
| 2008/0228458 A1 | 9/2008 | Smith | |
| 2009/0207169 A1 | 8/2009 | Wakayama | |
| 2009/0315839 A1 | 12/2009 | Wilson et al. | |
| 2010/0039380 A1 | 2/2010 | Lanier | |
| 2010/0206557 A1 | 8/2010 | Davies | |

FOREIGN PATENT DOCUMENTS

| | | |
|---|---|---|
| EP | 1 271 415 A1 | 1/2003 |
| JP | 6266806 A | 9/1994 |
| JP | 11184902 A | 7/1999 |
| JP | 11339070 A | 12/1999 |
| JP | 2000/182079 A | 6/2000 |
| KR | 20050041583 A | 5/2005 |
| WO | 2008/066907 A1 | 6/2008 |

OTHER PUBLICATIONS

Gueziec et al., "Cutting and Stitching: Converting Sets of Polygons to Manifold Surfaces", Transactions on Visualization and Computer Graphics, vol. 7, No. 2, pp. 136-151 (2001).

Kettner et. al., "Classroom examples of robustness problems in geometric computations", Computational Geometry: Theory and Applications, vol. 40, pp. 61-78, (2008).

Murali et. al., "Consistent Solid and Boundary Representations from Arbitrary Polygonal Data Computer Graphics", Proceedings of the 1997 Symposium on Interactive 3D Graphics, Providence, pp. 155-162 (1997).

Schaefer et. al "Dual Marching Cubes: Primal Contouring of Dual Grids", Computer Graphics Forum, vol. 24, No. 1, pp. 195-201 (2005).

Stefan Schirra, "Robustness and precision issues in geometric computation", Handbook of Computational Geometry (Jorg-Rudiger Sack and Jorge Urrutia, editors), Chapter 14, pp. 597-632, Elsevier Science Publishers (2000).

Segal et. al., "Partitioning Polyhedral Objects into Non-Intersecting Parts", IEEE Computer Graphics and Applications, vol. 8, No. 1, pp. 53-67 (1988).

Zhang et al., "Stereolithography by Rapid Prototyping Process of Large-Sized Parts," vol. 13, No. 3, Computer Integrated Manufacturing Systems (2007).

http://en.wikipedia.org/wiki/Planar_graph#Euler.27s_formula printed May 9, 2010.

http://www.protocam.com/blog/2008/04/prototyping-large-parts-why-we-have-no.html (Apr. 9, 2008).

http://www.shapeways.com/support/faq printed May 9, 2010.

http://www.transmagic.com/products/r8 printed May 9, 2010.

International Search Report No. PCT/IL10/00810 mailed Feb. 11, 2011.

\* cited by examiner

METHODS AND SYSTEM FOR ENABLING PRINTING THREE-DIMENSIONAL OBJECT MODELS

FIELD OF THE INVENTION

This invention generally relates to a method and system for transforming 3D (three-dimensional) digital models into valid printable models for 3D-printers mainly, but not only, for architectural use.

DEFINITIONS, ACRONYMS AND ABBREVIATIONS

Throughout this specification, the following definitions are employed:

Convex. Hull: The convex hull of a set of geometric object in three dimensional space $S \subset R^3$, denoted as conv(S), is the smallest (inclusion-wise) convex set containing S.

Convex Polyhedron: A convex polyhedron is a convex set $Q \subset R^3$ given as an intersection of finite number of closed halfspaces $H = \{h \in R^3 | A \cdot h \leq B\}$, where $A \cdot h \leq B$ is a linear equation system. If it is assumed that n is the number of defining halfspaces, then A is a $\{3 \times n\}$ matrix, B is vector of length n, and h is a variable that represents a point contained in the convex polyhedron.

Polytope: A bounded convex polyhedron $P \subset R^3$ is a polytope.

Hyperplane: In three-dimensional space, a hyperplane is an ordinary plane; it divides the space into two half-spaces.

Supporting hyperplane: A hyperplane supports a set S in Euclidean space $R^3$, if S is entirely contained in one of the two closed half-spaces determined by the hyperplane, and S has at least one point on the hyperplane. A closed half-space is the half-space that includes the hyperplane.

Width: The width of a set $S \subset R^3$, denoted as width(S), is the minimum distance between parallel hyperplanes supporting conv(S).

Directional width: Given a normalized vector v, the directional width, denoted as $width_v(S)$, is the distance between parallel hyperplanes supporting conv(S) and orthogonal to v.

Polygon Mesh: A polygon mesh, also called an unstructured grid, is a collection of vertices, edges, and faces, defining the shape of a polyhedral object in 3D (three-dimensional) computer graphics and solid modeling, for example. The faces usually consist of triangles, quadrilaterals, or other convex polygons, since this simplifies rendering, but may also be composed of more general concave polygons, polygons with holes, and the like. Generally, the input should consist of the geometric information and sufficient topologic information, so that the incident relation between the geometric objects can be retrieved.

STL: STL is a file format native to the stereolithography CAD (Computer-Aided Design) software created by the "3D Systems®" company located in the United States. This file format is supported by many other software packages; it is widely used for rapid prototyping and computer-aided manufacturing. STL files describe the surface geometry of a three dimensional object without representation of color, texture, or other common CAD model attributes. The STL format specifies both ASCII (American Standard Code for Information Interchange) and binary representations. Generally, binary files are more common, since they are usually more compact. Also, generally, each STL file describes a raw unstructured triangulated surface by the unit normal and vertices (ordered by the right-hand rule) of the triangles using a three-dimensional Cartesian coordinate system.

3D (Three-Dimensional) Printing: is a unique form of printing being related to traditional rapid prototyping technology. A 3D object is created by layering and connecting successive cross-sections of material. 3D printers are usually faster, more affordable and easier to use than other additive fabrication technologies. The resolution of the printer is given in layer thickness and XY resolution in DPI (Dots Per Inch). Usually, the layer thickness is approximately one hundred micrometers (0.1 [mm] (millimeters)), while XY resolution is comparable to that of laser printers. The particles (3D dots) are approximately 50 to 100 micrometers (0.05 mm-0.1 mm) in diameter.

Rapid: It should be noted that the term "rapid" is relative since construction of a model with contemporary methods can take, for example, from several hours to several days, depending on the method used and the size and complexity of the model. Additional systems for rapid prototyping can usually produce models in a few hours, although it can vary widely depending on the type of machine being used and the size and number of models being produced simultaneously.

Printable Model: A model is printable if it consists of a set of closed 2D (two-dimensional) manifolds, which bind volumes that do not intersect in their interior pair-wise, and also there exists a convex decomposition, such that the Z-directional (vertical) width of every convex piece is larger than a given threshold, and the XY-directional (horizontal) width of every convex piece is larger than a given threshold (X, Y, and Z are axes).

BACKGROUND OF THE INVENTION

During the last decade, 3D printers have become common tools for producing 3D physical objects from digital data, such as computer-aided design (CAD) models and animation models. As a consequence, the use of rapid prototyping is now commonplace in many domains. In particular, architects can greatly benefit from 3D printing. They can produce accurate 3D architectural objects within a few hours instead of days or even months. These prototypes enable a natural mechanism for repeated reevaluation of architectural projects during their progress, and in particular the detection of difficulties at early stages. Nowadays, e 3D printing can be optimized for speed, low cost, and ease-of-use, making it suitable for inspection during the conceptual stages of engineering design when accuracy and mechanical strength of prototypes are less important.

Many well-known firms, such as the international "Z Corporation®", "Object Technologies®", and "3D Systems®" companies, and the "Stratasys®" company, located in the United States, manufacture devices that produce 3D physical objects. These various devices are based on several different competing technologies. Evidently, 3D printers produced by different manufacturers, and also different models produced by the same manufacturer, pose different characteristics; they operate differently, and usually, are constrained to different restrictions. However, most if not all 3D printers, are based on additive manufacturing technology, which transforms the model to be fabricated into relatively thin horizontal cross-sections 105, and then creates successive layers 106, 107, etc. until the fabrication is complete, as schematically illustrated in FIG. 1. One of the differences between various 3D printers is the way layers are built to create portions of a 3D model to be printed. It should be noted that resolution is usually given in layer thickness, and the XY-resolution is given in dots per inch (DPI). It should be noted that the layer thickness is usually approximately a hundredth of a micrometer (0.1 mm), while XY-resolution is comparable to that of laser printers.

The particles (3D dots) are approximately from a fiftieth to a hundredth of a micrometer (0.05 mm-0.1 mm) in diameter.

Conventional 3D printers can produce correct 3D physical objects only when fed with valid printable models. Such models are represented as polygonal meshes, for example, in the STL (Stereolithography) file-format. A valid model represented as a polygonal mesh comprises a polygon-soup (an arbitrary set of polygons) that represents a closed 2D-manifold, i.e., a watertight object with substantially no artifacts, such as self-intersections, or a collection of closed 2D-manifolds that substantially do not intersect each other. A valid printable model satisfies additional requirements imposed by various printing devices (different printing devices impose different requirements, as they are based on different technologies).

It should be noted that correct and consistent representations of 3D objects are required by conventional applications, such as modeling, simulation, visualization, CAD (Computer-Aided Design), CAM (Computer-Aided Manufacturing), finite element analysis, and the like. However, the acquired 3D models, whether created by hand or by automatic tools, usually contain errors and inconsistencies. For example, they can contain wrongly-oriented, intersecting, or overlapping polygons, cracks, and T-junctions; in addition, polygons might be missing, and topological information can be inconsistent. Problems are caused by designer errors or software errors in the modeling tool. These errors can be compounded by data exchange problems, such as: (i) automated transfer between CAD formats (e.g., IGES (Initial Graphics Exchange Specification), STEP (Standard for Exchange of Product model data), DXF (Drawing Interchange Format), binary files from CATIA (Computer Aided Three-dimensional Interactive Application) or AutoCAD), between B-Spline or NURBS-based (Non-uniform Rational B-Spline) formats; (ii) geometric transformation into an engineering analysis system (e.g., a triangular surface mesh). The techniques to reconstruct manifold models from acquired 3D models vary according to efficiency, robustness, level of automation, preconditions, etc. Level of automation is measured in terms of required user input. Preconditions include requirements, such as: (i) polygons in the input set are consistently oriented; (ii) most polygons are orthogonal; or (iii) the input parts are closed 2D-manifolds. According to one prior art approach, scene-relative tolerances are used to "fill over" cracks in the model or merge features within some tolerance. Other approaches, such as boundary-based approaches, try to infer solid structures from how input polygons mesh together, and they are likely to perform incorrectly in the presence of non-manifold geometry. According to the prior art, all approaches do not work well when the size of errors are larger than the smallest feature in the model. As degenerate input is commonplace in practical applications and numerical errors are inevitable, an algorithm implemented without considering this issue may yield incorrect results, get into an infinite loop, or just crash, while running on a degenerate, or nearly degenerate, input (for example, as presented by Lutz Kettner et. al. in the article, titled "Classroom examples of robustness problems in geometric computations", published in "Computational Geometry: Theory and Applications", volume 40, pages 61-78, 2008; or as presented by Stefan Schirra, "Robustness and precision issues in geometric computation", "Handbook of Computational Geometry" (Jorg-Rudiger Sack and Jorge Urrutia, editors), chapter 14, pages 597-632, Elsevier Science Publishers, 2000.

According to the prior art, architects use CAD software, (e.g., AutoCad® and Revit®, developed by the AutoDesk° company, located in the United States) to produce various 3D digital models. These models may comprise architectural parts, such as walls, stairs, roofs, and the like. The data that represent each part might be corrupted or contain inconsistencies. Even if the data is flawless, each individual part might be non-suitable for 3D printing, as it might be insufficiently thick, or it might be floating in midair defeating gravity. Finally, all parts being combined together may not be suitable for 3D printing, as they might intersect each other and contain singularities.

It should be noted that CAD software has been in continuous evolution since its inception approximately thirty years ago. Commercial 3D CAD technology emerged with engineering software design products, such as SolidWorks®, Inventor®, PTC®, SolidEdge®, and many others that provided improvements to analysis and design capabilities in 3D space. The first techniques for rapid prototyping became available in the late 1980s, and commercial 3D printers followed immediately after with the purpose to bring real tangible models produced by 3D CAD software designs. Today, they are ubiquitous in many domains; they are used for a wide range of applications and are even used to manufacture production quality parts in relatively small numbers. Some sculptors use the technology to produce complex shapes for fine arts exhibitions. Yet the quality of the software input is relatively unsatisfactory. The fact that the input data for the 3D printers could contain a number of errors has led to the development of post CAD diagnostic and repair software, such as Materialise®, Marcam®, and Deskartes®, and the like.

The problems of 3D printing have been recognized in the prior art, and various solutions have been proposed. For example, US 2005/038549 discloses a system and method for performing adaptive modification of rapid prototyping build files. The method includes the step of reading a rapid prototyping build file that stores a digital description of a three dimensional object. The invention also includes the operation of selecting a build file correction algorithm from a plurality of build file correction algorithms. For another example, U.S. Pat. No. 5,705,117 presents a stereolithography process for developing a prototype part, in which inserts of a non-photopolymer material are included within the resulting part so as to develop a functioning prototype part. In order to allow the inserts to be placed within the developing prototype part, a series of STL files are defined for forming the prototype part in individual sections. A non-photopolymer insert is manually positioned on one section of the developing part each time a section is formed. In addition, U.S. Pat. No. 7,343,216 presents a method for assembling an architectural site model facilitating repeated placement and removal of foliage to the model. The site model is constructed as an upper shell portion and a lower base portion, while the model foliage is attached to the shell portion. The upper shell portion of the site model is configured for removable attachment to the lower base portion. Thus, removal of the shell from the site model also allows the foliage to be removed from the site model in one motion. Further, JP 11339070 presents a method for generating surface models by surfacing solid sub-models in a sub-file, taken in a main file, and united with a main solid model. For this, an altering operation, such as partial cutting, projection addition of the main solid model, is performed.

Based on the above observation, there is a continuous need in the art to provide a method and system enabling the transform of possibly corrupted and inconsistent models represented as polygonal meshes (e.g., non-manifold meshes, intersecting triangles, meshes with T-junctions, and the like) into valid printable models to be used for a relatively large set of printing devices.

Also, there is a continuous need in the art to provide a method and system enabling the transform of possibly corrupted or inconsistent digital models of 3D objects into models of physical objects that can be automatically constructed by using Solid Freeform Fabrication (SFF), a process also referred to as Rapid Prototyping (RP).

In addition, there is a need in the art to provide a method and system enabling handling models found in the architectural field, such as buildings and landscapes, as well as models found in many other fields, such as scientific visualization and physical simulation. Further, there is a need in the art to provide a method and system configured to fix corrupted models and to remove inconsistencies for various processes, such as 3D printing, assembly planning, and the like. Still further, there is a need in the art to provide a method and system enabling thickening operation of thin parts, while preserving their functionality, removing possible intersections and singularities and unifying all parts into a single printable model that consists of one or more closed 2D-manifolds with substantially no artifacts.

SUMMARY OF THE INVENTION

This Invention Relates to a Method and System for Transforming 3D (Three-dimensional) Digital Models into Valid Printable Models for 3D-printers Mainly, but not Only, for Architectural Use A method of transforming an inconsistent 3D (three-dimensional) model of one or more 3D objects into a valid printable 3D model, said method comprises:
  a) receiving an input model file and/or receiving modeler data, giving rise to an input 3D model having one or more parts;
  b) analyzing said input 3D model and removing its one or more inconsistencies;
  c) thickening the one or more parts of said 3D model, while preserving their functionality; and
  d) unifying the union of interior volumes of said one or more parts, thereby removing self-intersections and/or intersections between the two or more parts, giving rise to a valid printable 3D model.

According to an embodiment of the present invention, the method further comprises importing the input model file and/or the modeler data.

According to another embodiment of the present invention, wherein the importing further comprises one or more of the following:
  a) parsing the input model file; and
  b) obtaining the modeler data from a modeling application.

According to still another embodiment of the present invention, the method further comprises scaling or clipping the 3D model according to one or more predefined criterions.

According to still another embodiment of the present invention, the scaling is performed automatically to fix the bounding box defined by a 3D printer.

According to still another embodiment of the present invention, the scaling is performed manually based on a user-provided predefined scale factor.

According to still another embodiment of the present invention, the method further comprises controlling each step of said method by means of a viewer with a GUI (Graphical User Interface).

According to still another embodiment of the present invention, the method further comprises modifying the 3D model based on a physical analysis for connecting two or more disconnected model parts and forming a singly-connected 3D model.

According to a further embodiment of the present invention, the method further comprises dividing the 3D model into one or more separated sub-models.

According to still a further embodiment of the present invention, the method further comprises selecting at least one separated sub-model to be printed substantially independently.

According to still a further embodiment of the present invention, the method further comprises removing one or more singularities from the 3D model.

According to an embodiment of the present invention, the thickening further comprises one or more of the following:
  a) vertical thickening; and
  b) horizontal thickening.

According to another embodiment of the present invention, the thickening further comprises:
  a) determining whether the 3D model has convex subparts, and if not, decomposing parts of said 3D model into said convex sub-parts;
  b) computing the width of each sub-part; and
  c) thickening corresponding sub-parts, the vertical widths of which are smaller than a first predefined value, along the vertical direction, and thickening corresponding sub-parts, the horizontal widths of which are smaller than a second predefined value, along the horizontal direction.

According to still another embodiment of the present invention, the method further comprises exporting the 3D model to be 3D printed.

According to still another embodiment of the present invention, the exporting further comprises one or more of the following:
  a) storing the 3D model in an output model file that represents the model in a supported file-format; and
  b) sending the 3D model to a 3D printer.

According to still another embodiment of the present invention, the output model file is an STL (stereolithography) file to be used for 3D printing.

A system is configured to transform an inconsistent 3D (three-dimensional) model of one or more 3D objects into a valid printable 3D model, said system comprising:
  a) an input model file and/or modeler data provided from a data storage device;
  b) a sub-system configured to:
    b.1. receive an input model file and/or receive modeler data provided from said data storage device, giving rise to an input 3D model having one or more parts;
    b.2. analyze said input 3D model and remove its one or more inconsistencies;
    b.3. thicken the one or more parts of said 3D model, while preserving their functionality; and
    b.4. unify the union of the interior volumes of said one or more parts, thereby removing self-intersections and/or intersections between the two or more parts, thereby giving rise to a valid printable 3D model; and
  c) a 3D printer for printing said valid printable 3D model.

A program storage device readable by machine, tangibly embodying a program of instructions executable by the machine to perform a method of transforming an inconsistent 3D (three-dimensional) model of one or more 3D objects into a valid printable 3D model, said method comprises:
  a) receiving an input model file and/or receiving modeler data, giving rise to an input 3D model having one or more parts;

b) analyzing said input 3D model and removing its one or more inconsistencies;

c) thickening the one or more parts of said 3D model, while preserving their functionality; and d) unifying the union of interior volumes of said one or more parts, thereby removing self-intersections and/or intersections between the two or more parts, giving rise to a valid printable 3D model.

BRIEF DESCRIPTION OF THE DRAWINGS

In order to understand the invention and to see how it may be carried out in practice, preferred embodiments are described, by way of non-limiting examples only, with reference to the accompanying drawings, in which.

Figure 1:
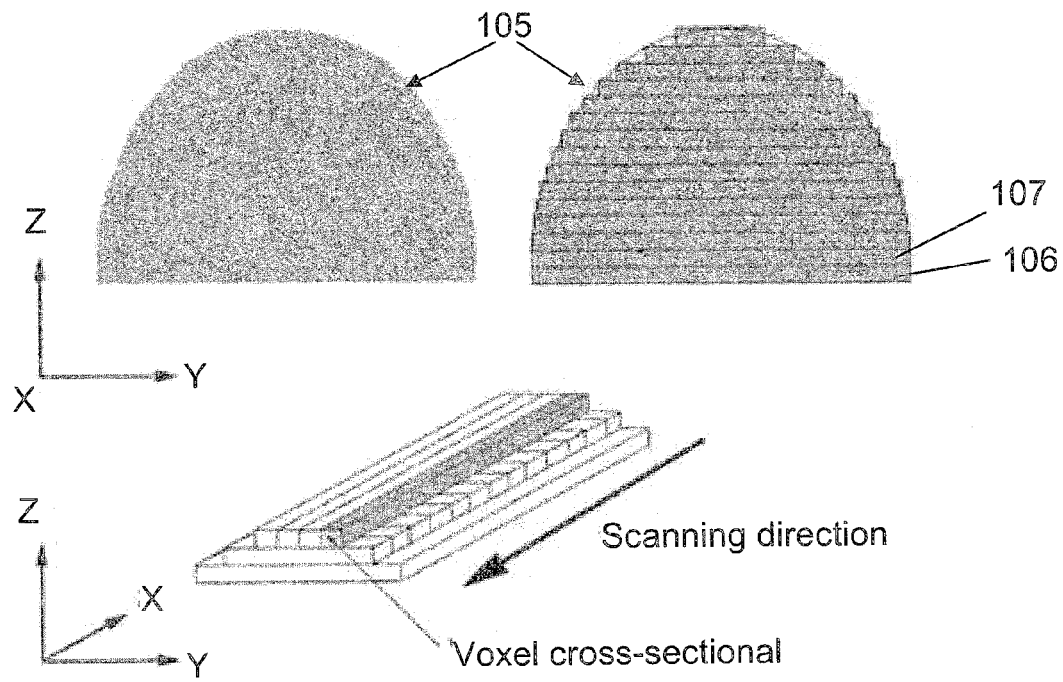
FIG. 1 is a schematic illustration of the prior art 3D printing technology, transforming the model to be printed into relatively thin horizontal cross-sections, and then creating successive layers until the printing is complete.

It will be appreciated that for simplicity and clarity of illustration, elements shown in the figures are not necessarily drawn to scale. For example, the dimensions of some of the elements might be exaggerated relative to other elements for clarity. Further, where considered appropriate, reference numerals might be repeated among the figures to indicate corresponding or analogous elements.

DETAILED DESCRIPTION OF THE PREFERRED EMBODIMENTS

Unless specifically stated otherwise, as apparent from the following discussions, it is appreciated that throughout the specification discussions utilizing terms such as "processing", "computing", "calculating", "determining", or the like, refer to the action and/or processes of a computer that manipulate and/or transform data into other data, said data represented as physical, e.g. such as electronic, quantities. The term "computer" should be expansively construed to cover any kind of electronic device with data processing capabilities, including, by way of non-limiting example, personal computers, servers, computing systems, communication devices, processors (e.g. digital signal processor (DSP), microcontrollers, field programmable gate array (FPGA), application specific integrated circuit (ASIC), etc.) and other electronic computing devices. Also, operations in accordance with the teachings herein may be performed by a computer specially constructed for the desired purposes or by a general purpose computer specially configured for the desired purpose by a computer program stored in a computer readable storage medium.

It should be noted that models produced by system 200 (FIG. 2), according to an embodiment of the present invention, are referred to as valid printable models or printable models for short. Generally, printable models satisfy a predefined set of requirements imposed by various printing devices. Different printing devices impose different sets of requirements, as they are based on different technologies. According to the present invention, system 200 satisfies a relatively large set of printing devices, and handles various architectural models, such as buildings and landscapes, as well as models found in many other fields, such as scientific visualization and physical simulation.

For simplicity, the detailed description of the present invention below mainly relates to models used for 3D printing. However, it should not be considered as limited to 3D printing only, and can be related also to fixing corrupted models and removing inconsistencies for assembly planning, and the like.

Figure 2:
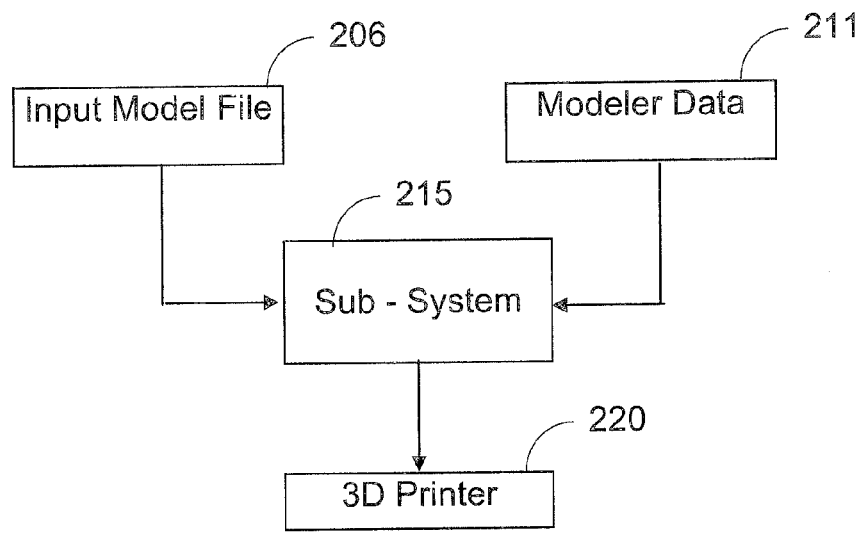
FIG. 2 is a schematic illustration of a system for transforming (converting) possibly corrupted and inconsistent models of 3D objects into valid printable models, according to an embodiment of the present invention.

FIG. 2 is a schematic illustration of a system 200 for transforming (converting) possibly corrupted and inconsistent models of 3D objects, which are represented for example as polygonal meshes (e.g., non-manifold meshes, intersecting triangles, meshes with T-junctions, and the like), into valid printable models, according to an embodiment of the present invention. According to an embodiment of the present invention, users (e.g., architects) of conventional software modeling-tools (e.g., AutoCad® and Revit®) create models of objects in 3D, such as buildings, landscapes, etc. A (digital) model created by each such tool comprises individual arbitrary parts in 3D (e.g., walls, stairs, and roofs) and their corresponding locations (i.e., translation and orientation) in 3D space. Several conventional file formats are used by these modeling tools to store the models (e.g., STL (stereolithography) and PLY (polygon) file formats). Some of these modeling tools enable third-party developers to extend the main application and provide new features through other computer programs commonly referred to as "plug-ins". Namely, the host application provides services, which the plug-in can use, including a way for plug-ins to register themselves with the host application and a protocol for the exchange of data with plug-ins. According to an embodiment of the present invention, sub-system 215 can be either a standalone application or a plug-in, accepting as input a model of an object in 3D space. System 200 comprises said sub-system 215 for receiving a file of an object model in the 3D space along with corresponding modeler data 211 (provided for example, from a memory unit (not shown)) and transforming (converting), such an object model into a valid printable 3D object model; and a 3D printer 220 for printing the valid three-dimensional object model. It should be noted that according to an embodiment of the present invention, modeler data 211 can comprise either solid modeling data and/or polygon soup (an arbitrary set of polygons).

According to an embodiment of the present invention, the 3D digital model is (automatically) examined by means of sub-system 215 for determining corruptions or inconsistencies. If one or more corruptions or inconsistencies are found, then said sub-system 215 fixes them. Then, the model for printing is (automatically) prepared by applying corresponding operations, such as thickening thin parts that are not sufficiently thick for the printer resolution. Also, functional parts (e.g., staircases and the like) are identified, and then dedicated thickening operations are applied on them, thereby preserving their functionality. After all individual parts are ready for printing (e.g., sufficiently thick and do not "float in mid air"), they are unified, eliminating intersections and possibly removing singularities. As a result, the final coherent model is obtained, which can be printed (fabricated) by a 3D printer 220.

According to an embodiment of the present invention, system 200 is able to parse models in the STL (Stereolithography), VRML (Virtual Reality Modeling Language), and X3D (XML-based (Extensible Markup Language) file format for representing 3D computer graphics) file formats. It also accepts models produced by modelers (modeling software), such as AutoCad® and Revit®, through their corresponding application-program interface (API). Further, system 200 can produce a valid printable model in various file formats, such as the STL file format that can be parsed by various 3D-printers, and thus it serves as a common format for representing 3D models for printing.

According to an embodiment of the present invention, model files 206 received at an input of system 200 may be corrupted or contain inconsistencies. Also, the physical sizes of individual parts may be relatively small for 3D printing; on the other hand, the size of the entire model with all parts included might be relatively large for 3D printing. In addition, the individual parts may intersect each other in their interiors, or they may intersect each other in their boundaries at vertices or edges, resulting in singularities. Thus, a sequence of operations is applied by means of sub-system 215, transforming (converting) the input model (file) 206 into a model that can be used for rapid prototyping and for other applications with similar requirements. The sequence of applied operations is implemented as a pipeline that consists of a predefined number of phases, such as nine phases, some of which may be optional and can be bypassed.

According to an embodiment of the present invention, system 200 enables transforming possibly corrupted or inconsistent digital models of 3D objects into models of physical objects that can be automatically constructed using Solid Freeform Fabrication (SFF), a process also referred to as Rapid Prototyping (RP).

It should be noted that the printable model must fit within a bounding box, for example, specified by the 3D printer 220 predefined requirements. According to another embodiment of the present invention, if the model is relatively large with respect to the bounding box, it must be either scaled down or clipped by the bounding box.

Figure 3:
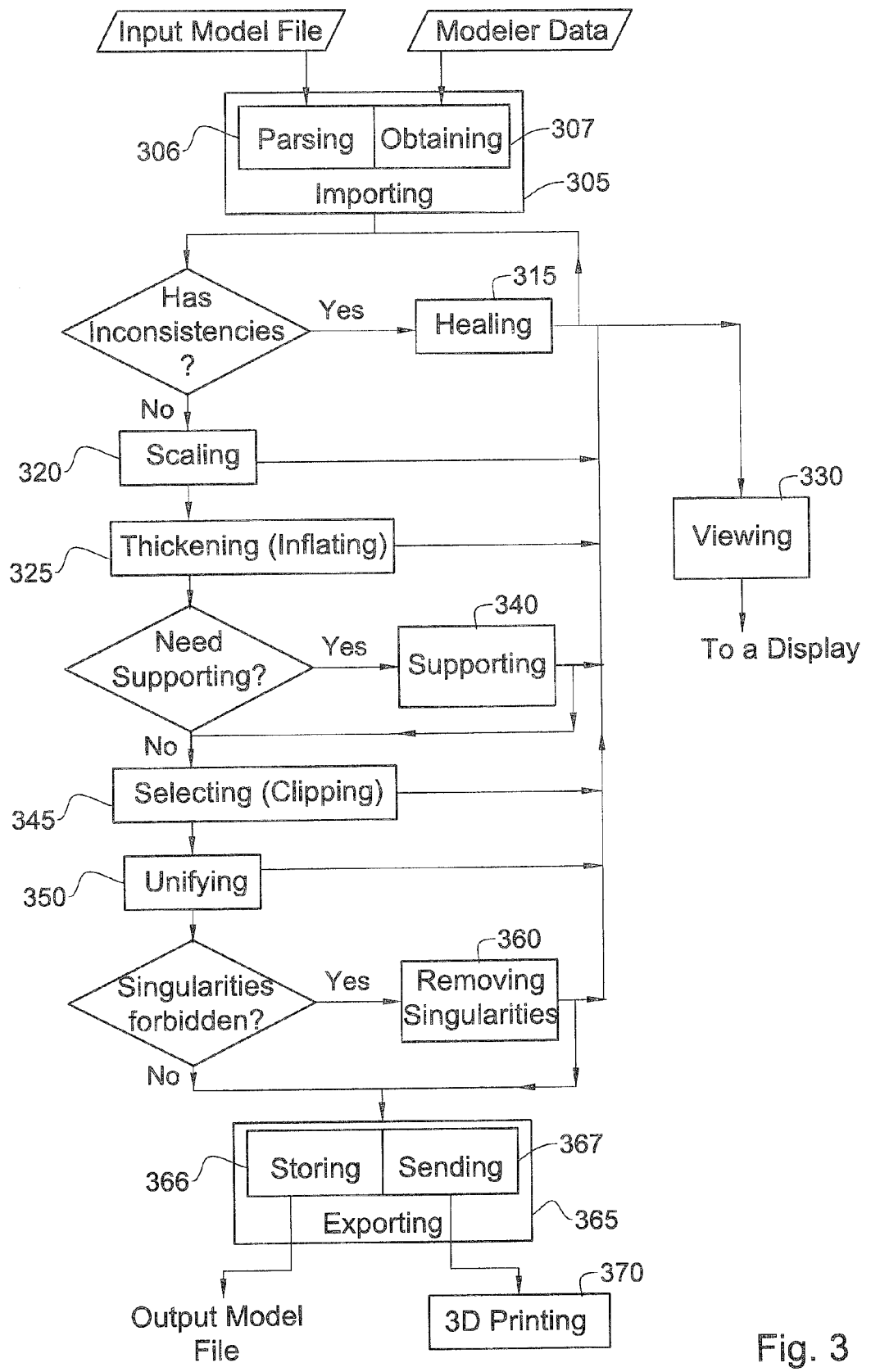
FIG. 3 is a flow-chart of a method for transforming possibly corrupted and inconsistent models of 3D objects into valid printable models, according to an embodiment of the present invention.

FIG. 3 is a flow-chart 300 of a method for transforming possibly corrupted and inconsistent models of 3D objects into valid printable models, according to an embodiment of the present invention. According to this embodiment, the method comprises nine main steps: importing 305, healing 315, scaling 320, thickening (inflating) 325, supporting 340, selecting (clipping) 345, unifying 350, removing singularities 360 and exporting 365, some of which are optional and can be bypassed (such as supporting step 340 and removing singularities step 360). In step 305, the model data is imported. The input model file 206 (FIG. 2), representing the model, is either obtained by parsing, in sub-step 306, a supported file-format, such as STL, or the data is obtained directly from a modeling application, in step 307, through the modeling application API (Application Programming Interface). In step 315, the (object) models are received, analyzed, and their inconsistencies (if any) are removed. For this, the closed 2D manifolds (which may intersect each other) are generated. This operation is referred to as healing. Then, in step 320, the model is scaled according to the user choice, either automatically to fit within the bounding box defined by the 3D printer 220 (FIG. 2), or manually by a user-provided scale factor. For this, the coordinates of the features of the model are mapped to the real-world coordinates. Naturally, this may still result in a model that is relatively large to fabricate (print) by a given 3D printer 220 (FIG. 2), as it escapes the building volume defined by said 3D printer 220. An independent viewer can be used to view (and setup/adjust, if required), in step 330, the output of each phase, and in particular the final output, which can be independently sent to 3D printer 220 (FIG. 2). It should be noted that a user can perform corresponding configuration of system 200, such as enabling dilating different kind of model objects, deciding whether to print one or more individual (sub-model) elements, selecting a 3D printer 220, selecting a scaling factor, and the like. Then, in step 325, the model is prepared for 3D printing by applying operations such as thickening thin parts, further considering (preserving) the functionality of the parts. After that, in step 340, the model is modified based on a physical analysis by adding, for example, supporting beams, to connect two or more disconnected components and form a model that is singly connected. After that, the selecting step 345 is applied, in which one or more model parts to be 3D printed are selected. This step starts with the automatic dismissal of parts that completely or partially escape the bounding box defined by the selected 3D printer. Manual selection of individual parts is supported as well. The viewer is used to carry out the selections of the user. The viewer can display the entire model with the selected parts rendered differently than the dismissed parts, distinguishing between the two complementing subsets. The rendering of the two subsets is separately controlled by the user. In step 350, the union of the interior volumes of the solid part (or parts), which were generated in step 340, are unified, thereby removing self-intersections and intersections between different parts. Then, singularities are removed from the model in step 360. That is, singular vertices and edges are identified and cut off, thereby resulting in a single (singularity-free) manifold, or the model is stitched resulting in several substantially disconnected 2D manifolds. Finally, in step 365, the model is exported. It should be noted that the model can be either stored in an output model file that represents the model in a supported file-format, or can be sent to a 3D printer 220 (FIG. 2) in step 370.

According to an embodiment of the present invention, the user observes the output of each one of the above steps using a viewer, which is an interactive software component that can render the model in three dimensions from various views, being controlled by said user. As the analysis operation during step 305 can require relatively much computation time, the user can control its complexity. Thus, by default, a low-complexity analysis can be performed. Also, the user can view, for example, the results of the healing process applied in step 315. If corruptions or inconsistencies remain and are observed by the user, then a high complexity analysis can be applied, According to an embodiment of the present invention, the result of step 305 is a valid model that consists of one or more closed 2D-manifolds with substantially no artifacts. The 2D manifolds, however, may possibly intersect each other.

According to an embodiment of the present invention, the healing (that is applied in step 315) enables reconstructing consistent models of 3D solids, and enables obtaining boundary representation from an arbitrary set of polygons (polygon soup), which define proper solid parts. Non-orientable 2D-manifolds, (e.g., a Klein bottle), and non-closed 2D-manifolds (e.g., a Mobius strip) comprise illegal input, as they do not define proper solids.

According to an embodiment of the present invention, a set of different methods (techniques), that automatically heals input models (presented, for example, by means of STL files), is provided. These methods may make a tradeoff between efficiency and quality, and the most efficient strategies may be used by default, for example. The user can be able to view the results and request to reprocess the models until the results are satisfying. As such, the result of the importing step 305 can be a valid model that consists of one or more closed 2D-manifolds with substantially no artifacts intersecting each other. It should be noted that the method of obtaining a relatively high quality model may generate models that are substantially free of inconsistencies; for this a technique introduced by T. M. Murali et. al (in the article titled "Consistent Solid and Boundary Representations from Arbitrary Polygonal Data Computer Graphics", Proceedings of the 1997 Symposium on Interactive 3D Graphics, Providence, pages 155-162, 1997) can be implemented. It should be noted that according to this technique, the space is partitioned into convex polyhedral regions separated by planes supporting the input polygons. Solid regions are identified by solving a linear system of equations derived from rules based on the opacities of boundaries between regions: 1) two adjacent cells sharing a mostly transparent boundary are likely to have the same solidities (i.e., if one is solid, then the other is too); 2) two adjacent cells sharing a mostly opaque boundary are likely to have opposite solidities (i.e., if one is solid, then the other is not); and 3) the unbounded cells (i.e., the ones on the outside that contain a point at infinity) are not solid. Once solid regions have been identified, the consistent solid model and boundary representations can be outputted without intersecting, coplanar, or unconnected polygons.

According to an embodiment of the present invention, a simple analysis, which exploits the commonly-known Euler formula for planar graphs (the Euler formula is presented, for example, on the following Web page: http://en.wikipedia.org/wiki/Planar_graph#Euler.27s_formula), is applied for each model part independently. Let u, e, and f denote the number of vertices, edges, and facets of each part, respectively. Then, the equation $v+f=e-2$ must hold. The simple, but relatively less time consuming, healing strategy proceeds as follows. First, identical and degenerate features, such as identical triangles, degenerate triangles/edges are removed. Then, epsilon-close features are merged, and T-junctions are eliminated by splitting edges. Such a split introduces two polygons that replace an original polygon.

It should be noted that terrain is a vertical dimension of the land surface. It is typically expressed in terms of elevation of the terrain features, and is represented by non-manifold 2D surfaces bounded by edges incident to single faces. A non-manifold 2D surface in 3D space that are bounded by edges incident to single faces either represents a terrain, or simply comprises an incomplete representation of a zero-volume part. The healing phase identifies such surfaces. Terrain surfaces are classified as such, and incomplete representations of objects, such as walls, are repaired. The remaining surfaces are removed. The repair operation of such a surface amounts to the introduction of a 2D surface with the opposite orientation; and a 1D (one-dimensional) surface along the boundary. This results in a zero-volume part that can be handled by thickening step 325.

According to an embodiment of the present invention, if the model is relatively large to meet the requirement (configuration) of the 3D printer, it must be either scaled down (at step 320) or clipped (at step 345) by a bounding box specified by the printer predefined requirements, for example. The scaling operation maps the coordinates of the features of the model to the real-world coordinates. Further, the clipping operation selects only those parts that are entirely contained in the bounding box, among the parts that comprise the model. According to an embodiment of the present invention, the scaling operation is applied before the thickening step 325, since the resulting model may contain parts that are insufficiently thick. According to another embodiment of the present invention, the clipping operation is applied before the unifying step 350, and the manual selection of individual parts may be also supported. The viewer (in step 330) is used to carry out the selections of the user. For example, the viewer can display the entire model with the selected parts rendered differently than the non-selected parts, distinguishing between the two complementing subsets. Also, the rendering of the two subsets may be separately controlled by the user. A.

According to an embodiment of the present invention, during the thickening and inflating step 325, each part of a model is analyzed to determine whether this part is sufficiently thick for the 3D-printing. If it is not sufficiently thick, then the part is altered in such a way that the resulting part becomes sufficiently thick. It should be noted that indiscriminate thickening may result in a distorted model that does not match the original model from a functional point of view. Thus, dedicated procedures are applied to the predetermined family of identified parts preserving their functionality. CAD models include different types of parts, such as walls, windows, staircases, mullions, roofs, floors, terrains, etc. The different types of parts are classified while they are created. If the classification is preserved, then a novel thickening method (algorithm) is applied in step 325, according to an embodiment of the present invention. According to another embodiment of the present invention, the thickening step may be applied twice to meet the two different corresponding thickening criteria, which are imposed by conventional 3D printers 220 (FIG. 2). According to the first criteria, all parts have to be sufficiently thick in the vertical direction. This can be referred to as vertical thickening. According to the second criteria, referred to as horizontal thickening, all parts have to be sufficiently thick in all directions contained in the XY-plane (X and Y are axes in a coordinate system). Generally, the vertical and horizontal thickening operations differ in two ways. First, the vertical thickening is relatively less involved, as it handles a single direction. Secondly, inflating is applied along the vertical dimension on specific families of parts. It is assumed that $t_v$ and $t_h$ are vertical (layer) and horizontal minimal thicknesses (having predefined values), respectively. The thickening operation consists of a few sub-steps. First, all parts are decomposed into convex sub-parts (polytopes); in many cases, the input model (file) already consists of convex sub-parts. Secondly, the width of each sub-part is computed. Then, the sub-parts, the vertical widths of which are smaller than $t_v$, are thickened along the vertical direction, and sub-parts, the horizontal widths of which are smaller than $t_h$, are thickened along the appropriate horizontal direction. When a sub-part is identified as insufficiently thick, then one or more facets of its boundary are translated, preserving the incident relations of the features of the boundary. Thickening along a given direction d amounts to translating of features in the d direction. There are three types of thickening operations, namely, scaling, inflating, and offsetting.

It is assumed that P is a part, and $w_v$ and $w_h$ are the vertical and horizontal widths of P, respectively. It should be noted that the normalized vector, directed at the direction of the vertical width, is $d_v=(0,0,1)$. It is assumed that the normalized vector, directed at the direction of the horizontal width, is $d_h=(d_x,d_y,0)$. If P is thickened using scaling, the following one or more predefined criterions (scaling factors) are used. If vertical thickening is applied, the part is scaled in the z-dimension only. The scale factor applied is the ratio between the desired width and the width, namely, $t_v/w_v$. If horizontal thickening is applied, the part is scaled in the x- and y-dimensions. The x- and y-scaling factors are $d_x \cdot t_h/w_h$ and $d_y \cdot t_h/w_h$, respectively. This results with minimally scaled up parts, yet sufficiently thick.

It is assumed that f is the feature supported by the plane perpendicular to the width direction, and F is the set of features containing f, its incident features, and the vertices incident to those features. If f is a facet, F contains the facet and all the vertices and edges on the boundary of f. If f is an edge, F contains the edge, its two incident facets, and all vertices and edges on the boundary of these two incident facets. If f is a vertex, F contains the vertex, all facets incident to the vertex, and all vertices and edges on the boundary of these incident facets. If P is thickened using inflating, the features in F are translated to meet the width requirements. They are translated by a vector directed at the width direction of length $(t_v-w_v)$ and or $(t_h-w_h)$ for vertical and horizontal thickening, respectively. Subsequently, the entire model is adjusted as schematically presented in FIG. 5B (parts 520 and 525). If P is thickened using offsetting, the supporting planes of all features in F are translated by a vector directed at the width direction of length $(t_v-w_v)$ and or $(t_h-w_h)$ for vertical and horizontal thickening, respectively.

It should be noted that the width of a polytope is the penetration depth between the polytope and an identical copy of the polytope, which in turn is the minimum distance between the origin and the Minkowski sum of the polytope and its reflection through the origin (for example, as presented by E. Berberich et. al in the article, titled "Arrangements on Parametric Surfaces II: Concretizations and Applications", submitted to Mathematics in Computer Science, Springer, 2009.

The Gaussian map of the Minkowski sum of two polytopes P and Q is the spherical overlay of the Gaussian map of P and the Gaussian map of Q. For each polytope P, the Gaussian map of P and the Gaussian map of its reflection are computed. Then, the overlay of the two Gaussian maps is computed, and the Gaussian map of the Minkowski sum of P and its reflection are obtained. After that, the facets of the Minkowski sum are obtained. Finally, the vertical and horizontal distances between the origin and those facets are computed. If the vertical and horizontal distances are smaller than $t_v$ and $t_h$, respectively, then according to an embodiment of the present invention, one of the thickening operation (e.g., scaling, inflating, and offsetting) is applied until the distance criteria are met. It is relatively sufficient to apply it once in the vertical direction. However, to meet the distance criteria in the horizontal direction, applying the thickening more than one time (i.e., in a loop of several times) might be required.

According to an embodiment of the present invention, the input model (file) may contain terrain parts represented as 2D surfaces in 3D space. A terrain surface has to be converted into a solid part with non-zero volume. For this, first, all terrain surfaces are identified in the input model. The identification of terrain surfaces may be relatively simple, if their classification is retained in the input model. Also, according to this embodiment of the present invention, the terrain surfaces, which were not classified as such to start with during healing step 315, are identified. Once a terrain surface is identified, the surface vertices are projected onto a plane parallel to the XY-plane, and the necessary boundary polygons are introduced, forming a 2D manifold valid for the 3D printing. It is supposed that p ($p=(p_x,p_y,p_z)$) is a point of the terrain surface with the smallest vertical coordinate $p_z$ (X, Y and Z are axes of a coordinate system). Then, the plane that contains the projection at $z=v_z-t_v$ can be placed, satisfying the minimum vertical width criteria.

According to another embodiment of the present invention, if the translation operation to the boundary of a thin part relates to a roof or a floor, then the entire model has to be adjusted. The combined operation of translating and adjusting is referred to as inflating. Generally, the inflation operation can be considered as a variant of the thickening operation that affects features of parts that lie above the translated feature with the lowest vertical coordinate.

Thus, the inflation operation substantially does not introduce intersections between the interior of model parts.

According to still another embodiment of the present invention, an auxiliary data-structure of all points of all parts, sorted lexicographically, is maintained first according to their z-coordinate, then according to their y-coordinate, and finally, according to their X-coordinate. It is supposed that P is a part that is insufficiently thick, and $p=(p_x,p_y,p_z)$ is a point on its boundary with the smallest z-coordinate $p_z$ among all points of P being translated during the thickening operation. Also, it is supposed that $v_z$ is the translation vector. Then, substantially all points of the parts that have z-coordinates equal to, or larger than $p_z$, are translated by means of $v_z$. These points may be relatively easily found in the auxiliary data-structure, and then the edges and facets incidents are updated to the translated points.

As is known, generic thickening may result in distorted objects when applied indiscriminately. The generic thickening operation may deform an operand object to the point where the resulting object does not serve the purpose it was originally designed to serve by the modeler (e.g., the architect). It should be noted that staircases and mullions are relatively sensitive to such distortions. Thus, according to an embodiment of the present invention, if the input model contains staircases or mullions, and they can be identified as such, either automatically or by a user, then a (user-controlled)

dedicated thickening operation is applied that replaces the original model part, referred to as the source, with a new model part, referred to as the target, that (i) serves the same functionality as the source, and (ii) meets the width criteria. For this, a relatively large database of ready-made 3D printable parts is created and categorized according to the functionality of said 3D printable parts. The candidate pairs of parts (a source part to be removed and a target part to be inserted instead) can be automatically suggested by means of system 200 (FIG. 2), according to an embodiment of the present invention. System 200 enables a user to add or remove candidates, and it also enables the user to override target parts, using the viewer for convenient interactive choice-making. Once a pair is certified (the substitution between a specific source and target parts is authorized, the bounding box of the source part is computed, the target part is clipped to fit within the bounding box, and finally, the scaled target part is inserted instead of the source part.

According to an embodiment of the present invention, the input model may contain parts that are not supported relatively well, or "float in mid air". According to this embodiment of the present invention, the fabrication (printing) of such an input model may be enabled by accomplishing the following two steps. During the first step, layers of each part are successively added while certain pieces of each layer are solidified. During the second step, the pieces that were not solidified are washed off and removed (it is supposed that these both steps are denoted as supporting step 340 in FIG. 3). Parts that are not supported relatively well, referred to as floating parts, are disconnected and lose their position relative to the origin and to the remaining parts. Thus, such floating parts are identified. For each floating part, the introduction of a new part that supports the floating part is provided. The supporting part is connected to the center of gravity of the floating part on one hand, and to the first part encountered by a ray shot in some direction on the other. It should be noted that the negative vertical direction may be used by default for the shooting direction.

According to an embodiment of the present invention, the model further may not fit within the building volume, typically a box aligned with the major axes, defined by 3D printer 220. According to an embodiment of the present invention, the building volume has to contain all parts to be printed. All parts that completely or partially escape the building volume may be automatically dismissed. It should be noted that, by default, all parts that are completely inside the building volume are selected for printing. In addition, a user can apply manual selections utilizing the viewer in viewing step 330, under the condition, for example, that parts that escape the building volume cannot be selected for 3D printing. Also, system 200 supports a subdivision operation applied during selecting step 345, in which the parts to be 3D printed are selected. The user can request the system to subdivide the set of parts that comprise the model into several (separated) subsets. This may become useful when the model is not entirely contained in the building volume. Further, an automatic tool can divide the model into sub-models that can be fabricated (printed) independently. The user can move parts from one subset to another utilizing the viewer. The different subsets are may be then processed independently.

According to an embodiment of the present invention, the model outputted from the healing step 315 contains parts, which are watertight with substantially no artifacts. However, the parts may intersect, and their union may not represent a closed 2D-manifold. In addition, the thickening step 325 may even increase the number of intersections (it may also replace intersections between boundaries of model parts with intersections between their interiors). Thus, the intersections between interiors of parts are removed in unifying step 350, which may employ two methods with different characteristics, according to an embodiment of the present invention. The first method is an extension of the prior art Dual Marching Cubes (DMC) algorithm (as presented S. Schaefer et. al in the article, titled "Dual Marching Cubes: Primal Contouring of Dual Grids", Computer Graphics Forum, volume 24, number 1, pages 195-201, 2005), and the second method is an implementation of a prior art technique introduced by M. Segal et. al in the article titled "Partitioning Polyhedral Objects into Non-Intersecting Parts", IEEE Computer Graphics and Applications, volume 8, number 1, pages 53-67, 1988. It should be noted that the main idea behind the Dual Marching Cubes algorithm is to construct an adaptive volume partitioning (octree) around an object (part), and instead of applying the Marching Cubes (MC) algorithm to the octree, a dual graph is constructed, and then Marching Cubes algorithm is applied to it. The DMC algorithm allows generation of an output that is closer to the input surface. In addition, the DMC algorithm requires a volumetric function, whose value represents density information or a distance to a surface. According to this embodiment of the present invention, the conventional Dual Marching Cubes algorithm (method) is extended to handle inconsistent meshes instead of isosurface functions, which results in a single valid mesh that is suitable for 3D printing. In other words, the Dual Marching Cubes algorithm is applied to 2D-manifold meshes in order to create a single closed 2D-manifold surface of their union. Since the Marching Cubes algorithm requires a distance field (isosurface) at the corners of the voxels (volume pixels) (which is not defined for a set of meshes), and since the MC algorithm is applied to the dual graph, there is a need to have a dual point and a value for each voxel in the octree (a tree data structure in which each node has up to eight "children"). The dual point is placed on the input surface (for example, if a single plane passes through the voxel, it will be placed on the plane or at the vertex, if it is the only feature in the voxel), and the value is set to a relatively small negative value. Then, according to an embodiment of the present invention, when the maximum depth is reached and the voxel still needs to be subdivided, ray tracing can be used to determine if the center of the voxel is inside or outside of the input volume, and its value is set accordingly. It should be noted that "ray tracing" is a well-known conventional method for calculating the path of waves or particles through a system. The reason that relatively small negative values are used is that this allows having the output surface to be relatively close to the input surface.

According to another embodiment of the present invention, the model resulting from unifying step 350 may contain topological singularities. Thus, at step 360, such singularities can be removed from non-manifold sets of polygons to create manifold polygonal surfaces. This step of removing model singularities is optional, since a model with singularities is, generally, printable. On the other hand, it should be noted that in many cases it is desired to have a model that does not have disconnected components. The step 360 of removing singularities can be based, for example, on an algorithm introduced by A. Gueziec et al in the article, titled "Cutting and Stitching: Converting Sets of Polygons to Manifold Surfaces", published in IEEE Transactions on Visualization and Computer Graphics, volume 7(2), pages 136-151, 2001. For removing model singularities, first, singular vertices and edges are identified. Then, the identified singular vertices are multiplied, and cut through singular edges, resulting in several disconnected manifold solid parts. If an optional stitching operation is required (e.g., requested by a user), boundary edges are joined to maintain the surface as a manifold. The variant of the implemented algorithm ensures that the widths of the substituting polytopes are sufficiently large for 3D printing. It should be noted that singularities may be forbidden, according to a user choice.

According to an embodiment of the present invention, during the exporting step 365, the output 3D model is either stored in a supported file format, such as the STL file format, or is directly sent to 3D printer 220 (FIG. 2) to be fabricated. It should be noted that the output 3D model, stored in a file in one of the supported file formats, can be read and sent to a 3D printer at any time. If the output of system 200 (FIG. 2) consists of several models, each model can be stored in a separate file. Similarly, each such 3D model file can be sent to a 3D printer at any convenient time.

According to an embodiment of the present invention, an independent interactive component, referred to as the viewer, allows a user, at step 330, to view the output of each one of the steps presented in FIG. 3, apply certain changes, and override default settings. The viewer renders the model onto a window on the screen (display) projecting the three-dimensional digital model, as seen from a certain point of view, onto the 2D plane containing the screen. The user can interactively and relatively smoothly change the point of view. The user can also change other related viewing parameters, such as whether to use orthographic or prospective projections. The viewer can be equipped with a graphical user-interface (GUI) that allows the user to set, reset, or override various system parameters. 3D printer 220 (FIG. 2) defines a building volume, typically a box aligned with the major axes, that contains all parts to be printed. The viewer can render the building volume imposed by 3D printer 220, highlighting the parts that completely or partially escape the building volume, and therefore must be dismissed. By default, all parts that are completely inside the building volume are selected for printing. The viewer renders the parts selected for printing. It can also render the non-selected parts, and it can render the two complement sets in a way that the user can distinguish between a selected and a non-selected part. The viewer enables the user to override the default selections made by system 200 (FIG. 2), moving parts from the selected set to the non-selected set and vice-versa (with the exception, for example, of parts that escape the constraining volume and may not be selected for printing).

According to another embodiment of the present invention, the user can request system 200 to subdivide the set of parts that comprise the model into several subsets. This may become especially useful when the model is not entirely contained in the building volume. An automatic tool divides the model into (separate) sub-models (sub-models) that can be fabricated (printed) independently. Parts in different sets are rendered differently, and the user can move parts from one set to another. The different sets are then processed further substantially independently. The viewer allows the user to examine the "healed" model, that is, the output of healing step 315. If the user is unsatisfied with the results, then the user can select a different healing strategy and repeat the application of the healing operation. Further, the viewer can use different strategies of validation schemes, and it can display potential artifacts in the model that may affect 3D printing. It also may allow the user to mark those potential artifacts and provide them as hints to the healing operation. According to still another embodiment of the present invention, the viewer also allows the user to change the scaling factor dynamically. In addition, it allows the user to change many parameters of system 200, such as setting the vertical and horizontal thickening criteria. The viewer enables the controlled substitution of selected parts, that otherwise would be deformed by the generic thickening operation, and lose their intended functionality. Further, according to still another embodiment of the present invention, the viewer allows the user to examine the model before it is sent to 3D printer 220 in step 370, or saved in an output model file in step 366 (the user may choose the desired format of the output file from a predetermined set of formats).

Figure 4A:
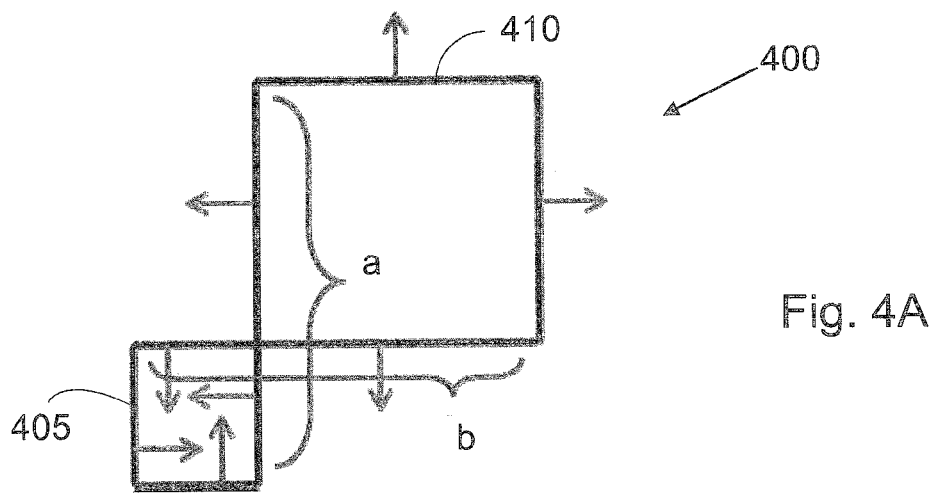
FIG. 4A is a schematic illustration of a self intersecting model, according to an embodiment of the present invention.

FIG. 4A is a schematic illustration of a self intersecting polygon 400 that might appear as a facet in an input model, according to an embodiment of the present invention. Edges 'a' and 'b' of model parts 405 and 410 intersect each other. The bounded area at the top right is defined and closed, but the bounded area on the bottom left is not. The exhaustive healing strategy fixes this flaw. In particular, self intersecting polygons that comprise invalid facets are split into several polygons, some of which are retained and the others are removed.

Figure 4B:
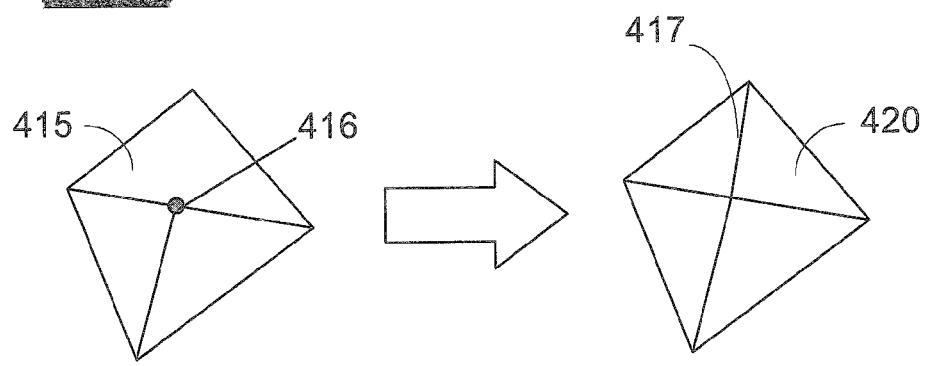
FIG. 4B is a schematic illustration of eliminating a T-vertex through the introduction of an appropriate edge, according to an embodiment of the present invention.

FIG. 4B is a schematic illustration of eliminating a T-vertex 416 through the introduction of an appropriate edge 417, according to an embodiment of the present invention.

Figure 4C:
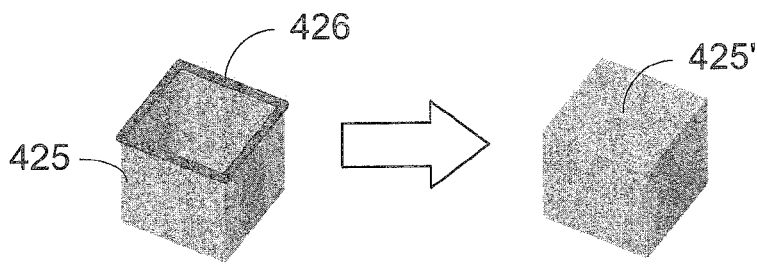
FIG. 4C is a schematic illustration of forming a watertight model by adding the missing quadrilateral, according to an embodiment of the present invention.

FIG. 4C is a schematic illustration of forming a watertight model 425' by adding the missing quadrilateral 426 in model 425, according to an embodiment of the present invention. The top polygon that comprises a facet is missing from the model of the part on the left. The missing polygon is added to form a watertight model on the right.

Figure 4D:
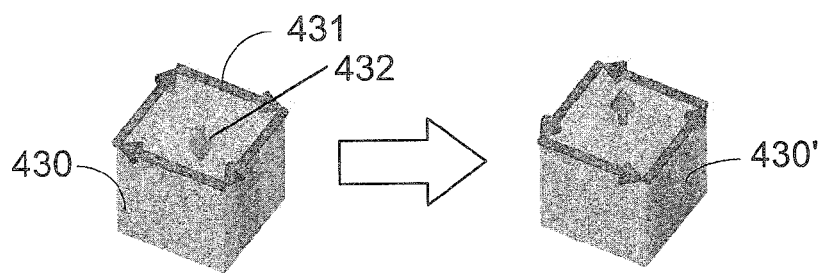
FIG. 4D is a schematic illustration of forming a watertight model by flipping the wrongly oriented polygon, according to an embodiment of the present invention.
Figure 5A:
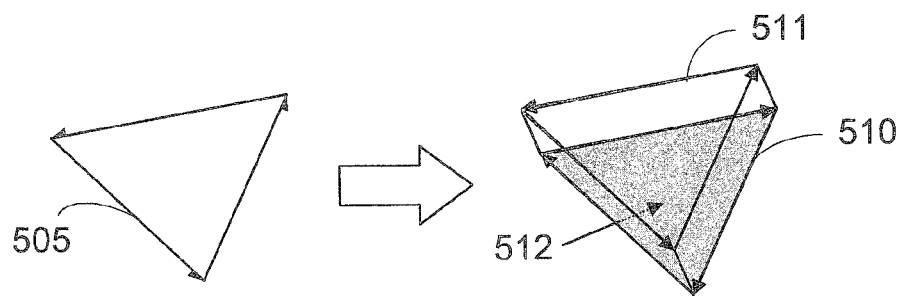
FIG. 5A is a schematic illustration of converting a single triangle into a prism with zero volume during the healing step, while the distance between the top and bottom triangles is zero, according to an embodiment of the present invention.

FIG. 4D is a schematic illustration of forming a watertight model 430' by flipping the wrongly oriented polygon 431, according to an embodiment of the present invention. The order of the vertices on the boundary of a polygon must be counter clockwise. The vertices on the boundary of the top polygon that comprises a facet in the model of the part on the left are in clockwise order. This implies that the normal to the underlying plane is erroneously directed downwards, as illustrated in the figure by arrow 432. The order of the vertices on the boundary of the wrongly oriented polygon is reversed to form a watertight model on the right, FIG. 5A is a schematic illustration of converting a single triangle 505 into a prism with zero volume during the healing step 315 (FIG. 3), while the distance between the top 511 and bottom 512 triangles is zero, according to an embodiment of the present invention. It should be noted that top and bottom triangles 511 and 512 are separated in FIG. 5A only for clarity. This figure illustrates the handling of terrain data. It should be noted that terrain is a vertical dimension of the land surface; it is typically expressed in terms of elevation of the terrain features, and is represented by non-manifold 2D surfaces bounded by edges incident to single faces. During the healing step 315, the disconnected single triangle 505 is identified and classified as terrain. Then, a triangle with the opposite orientation is introduced along with other features that form prism 510. This results in a zero-volume part that can be handled by thickening step 325.

Figure 5B:
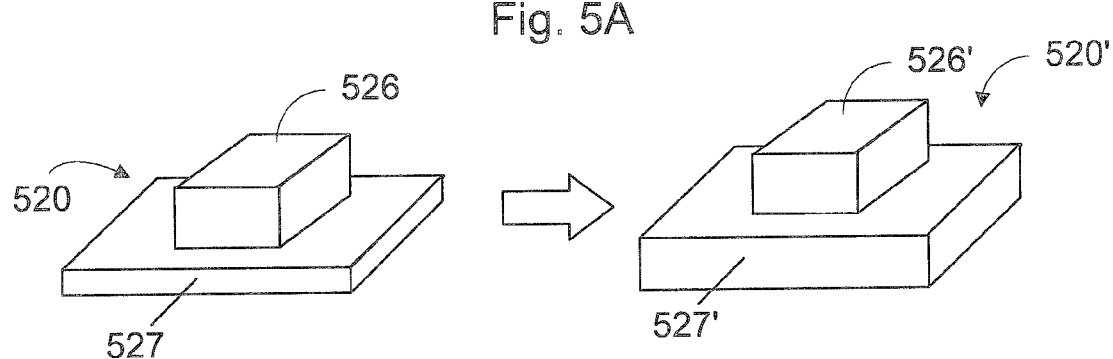
FIG. 5B is a schematic illustration of the inflating operation, according to an embodiment of the present invention.

FIG. 5B is a schematic illustration of inflating, applied in step 325 (FIG. 3), according to an embodiment of the present invention. The inflated model 520' comprises two parts 526' and 527' that have the shape of a box differently scaled (similarly to original (non-inflated) model 520, comprising two parts 526 and 527). The plane containing the top facet of the bottom box 527' also contains the bottom facet of the top box 526'. The bottom box 527' is insufficiently thick in the vertical direction. Therefore, it is inflated in the vertical dimension. That is, the top facet and its incident features (i.e., vertices and edges on its boundary) are translated along the positive Z direction. As a result, all features located above the plane containing the top facet of the bottom box 527' are translated as well.

Figure 5C:
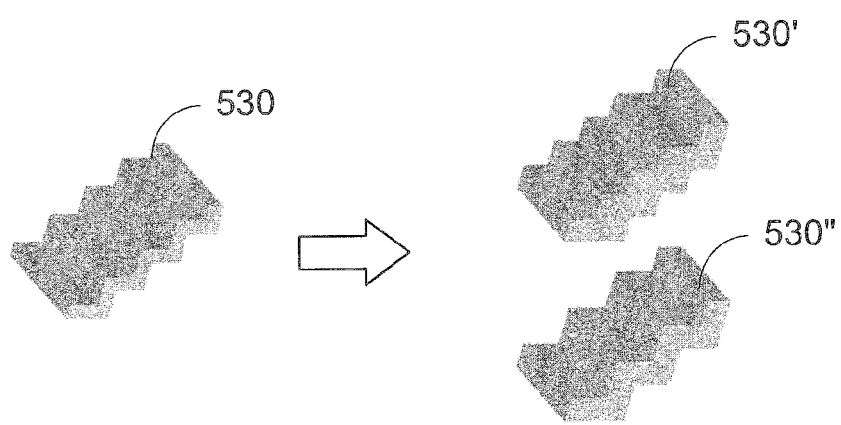
FIG. 5C is a schematic illustration of a generic thickening operation applied to a staircase (consisting of thin parts), according to an embodiment of the present invention.

FIG. 5C is a schematic illustration of a generic thickening operation applied to a staircase 530 (consisting of thin parts), giving rise to a staircase 530', according to an embodiment of the present invention. Staircase 530" is an alternative the user can choose over the generically generated staircase model 530'. Staircase 530" is either the result of a scaled up thickening operation applied to staircase 530, and then clipped by the bounding box of the original part, that is, staircase 530, or it is an example of an extracted model from a data-base of staircases the user has access to through system 200 (FIG. 2).

Figure 5D:
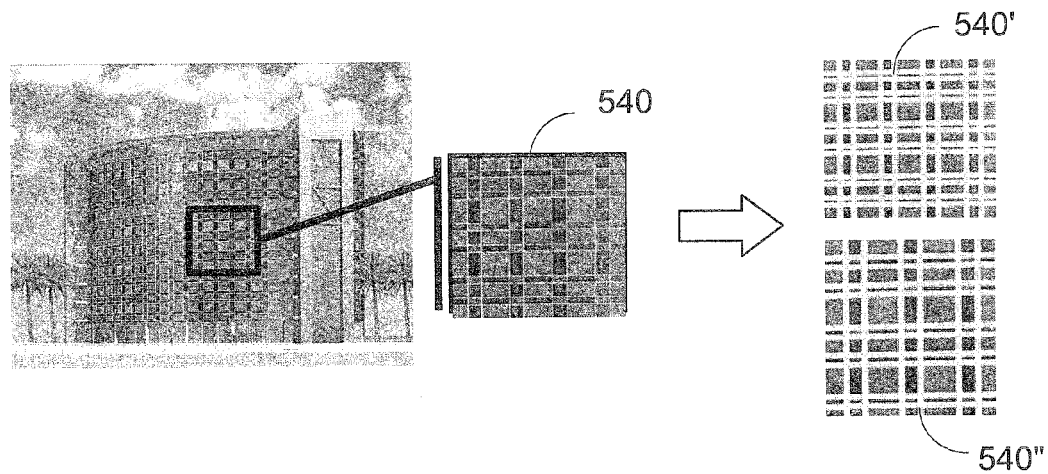
FIG. 5D is a schematic illustration of a generic thickening operation applied to mullions model (consisting of thin parts), according to an embodiment of the present invention.

FIG. 5D is a schematic illustration of a generic thickening operation applied to mullion model 540 (consisting of thin parts), giving rise to a mullion model 540', according to an embodiment of the present invention. Mullion model 540" is an alternative the user can choose over the generically generated mullions model 540' to replace the original model (i.e., mullion model 540). The model comprises of parts that divide the adjacent window units. The parts are drawn in white, while the windows, which are typically not selected for 3D printing, are drawn in non-white. The result of generic scaling, namely mullion model 540', contains thick window dividers and small windows (in terms of height and width). This it might be desired to retain the size of windows, at the account of a reduced number of windows, such as in the alternative mullion model 540".

Figure 6A:
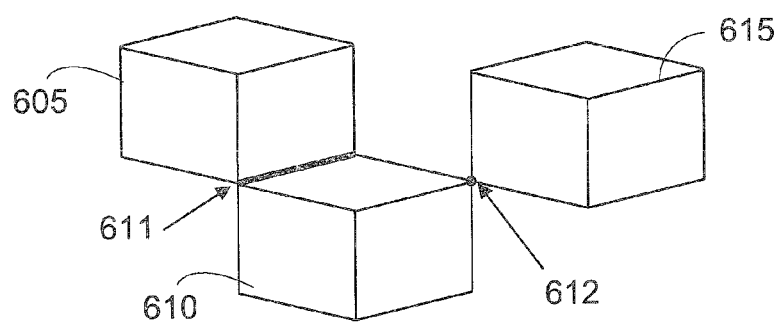
FIG. 6A is a schematic illustration of models that contain topological singularities, according to an embodiment of the present invention.

FIG. 6A is a schematic illustration of models 605, 610 and 615 containing topological singularities 611 and 612, according to an embodiment of the present invention. These models form a non-manifold solid part The non-manifold (singular) edge 611 and vertex 612 are drawn with a thicker pen.

Figure 6B:
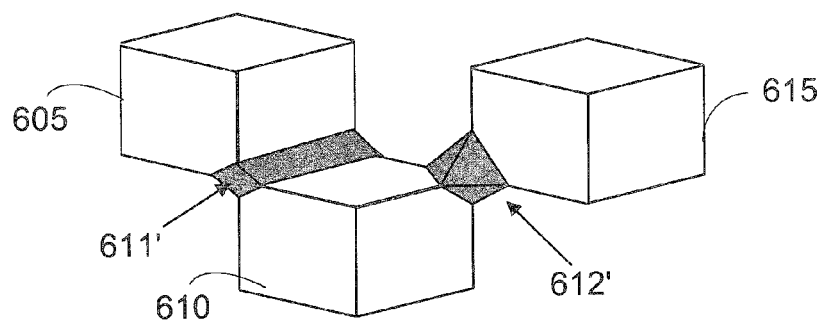
FIG. 6B is a schematic illustration of models, to which a stitching operation was applied, thereby removing topological singularities, according to an embodiment of the present invention.

FIG. 6B is a schematic illustration of models 605, 610 and 615, to which a stitching operation was applied, thereby removing topological singularities 611 and 612 (FIG. 6A), according to an embodiment of the present invention. The singular vertex 611' and edge 612' are identified. Then, the identified singular vertex 611' and the vertices incident to the singular edge 612' are multiplied. Finally, boundary edges are joined to maintain the surface as a manifold. According to an embodiment of the present invention, sub-system 215 (FIG. 2) ensures that the widths of the newly introduced polytopes during stitching are sufficiently large for 3D printing.

Figure 7:
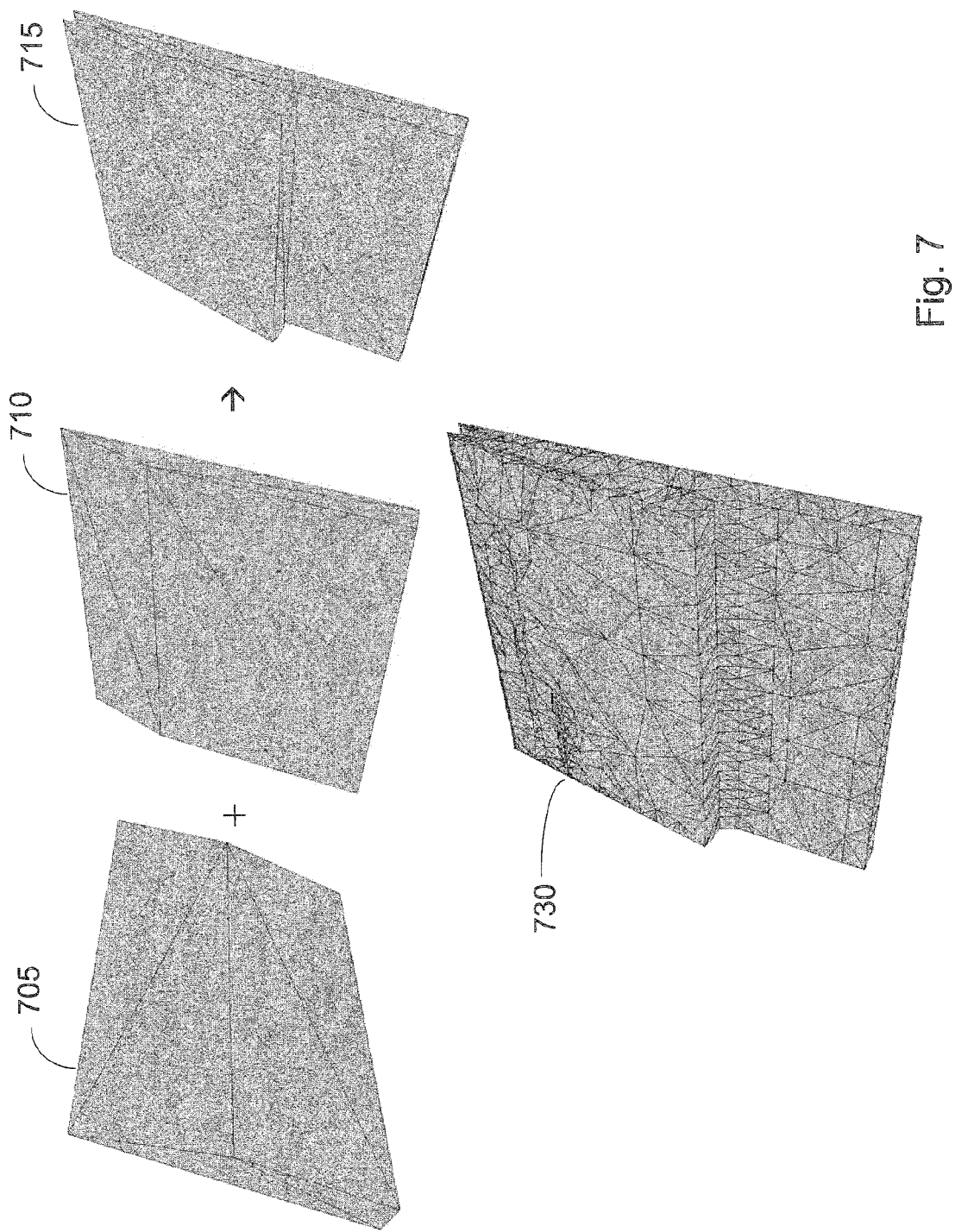
FIG. 7 is a schematic illustration of unifying two watertight walls with their mesh, according to an embodiment of the present invention.

FIG. 7 is a schematic illustration of unifying two watertight walls 705 and 710 with their mesh created, for example, by Revit® software, according to an embodiment of the present invention. According to an embodiment of the present invention, the conventional Dual Marching Cubes algorithm (method) is extended to handle inconsistent meshes instead of isosurface functions, which results in a single valid mesh that is suitable for 3D printing. In other words, the Dual Marching Cubes algorithm is applied to 2D-manifold meshes in order to create a single closed 2D-manifold surface of their union. Since the Marching Cubes algorithm requires a distance field (isosurface) at the corners of the voxels (which is not defined for a set of meshes), and since the MC algorithm is applied to the dual graph, there is a need to have a dual point and a value for each voxel in the octree. The dual point is placed on the input surface (for example, if a single plane passes through the voxel, it will be placed on the plane or at the vertex, if it is the only feature in the voxel), and the value is set to a relatively small negative value. Then, according to an embodiment of the present invention, when the maximum depth is reached and the voxel still needs to be subdivided, ray tracing can be used to determine if the center of the voxel is inside or outside of the input volume, and its value is set accordingly. The reason that relatively small negative values are used is that this allows having the output surface to be relatively close to the input surface. As a result, by applying this method to the model 715, a single continuous 2D-manifold solid mesh 730, that is valid for the 3D printing, is generated. It should be noted that the proposed method (extended from the Dual Marching Cubes algorithm) can be used either for architecture (handling, for example, buildings and landscapes 3D models) or for any other field.

Figure 8:
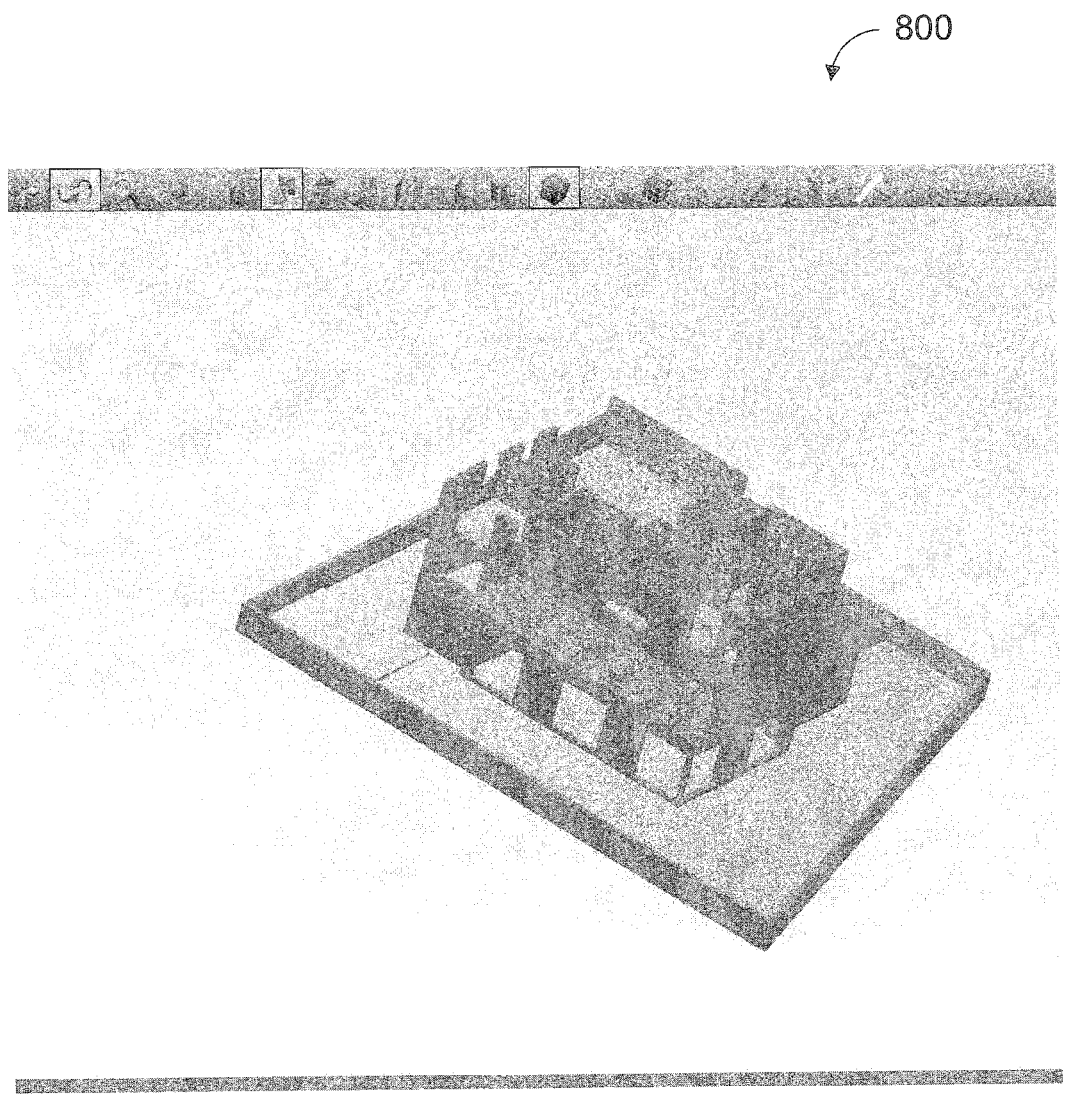
FIG. 8 is an illustration of a sample GUI that displays the STL file format and enables a user to control and select model objects to be 3D-printed, according to an embodiment of the present invention.

FIG. 8 is an illustration of a sample GUI that displays the STL file format and enables a user to control and select model objects to be 3D-printed, according to an embodiment of the present invention. According to this embodiment, there can be a problem to print in 3D a relatively large model by using, for example, STL model files. Thus, an automatic tool is presented that can automatically divide the model into two or more sub-models (sub-models) and to print each of them independently. In other words, the STL file can be divided into two or more valid STL files so that each of them contains a closed 2D-manifold mesh. Also, a corresponding GUI (Graphical User Interface) that displays the input and output format files, marks STL invalid regions and allows the user to select one or more parts to be printed, can be provided. This GUI may display all model parts and the STL output, and thus allow architects, for example, to select the parts to be 3D-printed. The GUI may also comprise a STL-validation tool that displays artifacts in the STL file that can affect 3D-printing (such as gaps, intersections and degenerate/colinear triangles/edges) and let the architect decide whether to change these specific problematic parts or to continue to 3D-printing. In addition, the STL file can be converted to other formats, such as VRML that can be visualized by the GUI.

Figure 9A:
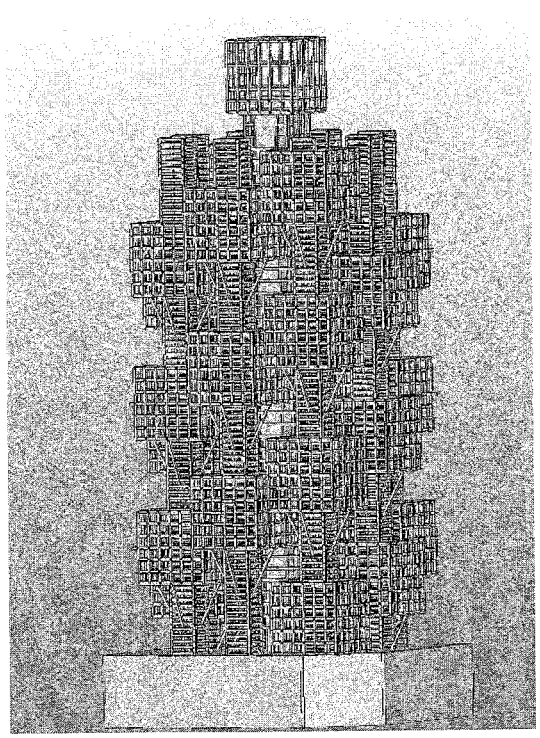
FIG. 9A is sample illustration of a digital model solid model, which was provided as an input to the system of the present invention, then processed by means of said system and printed by means of a 3D printer, giving rise to a physical solid model shown on FIG. 9B, according to an embodiment of the present invention.
Figure 9B:
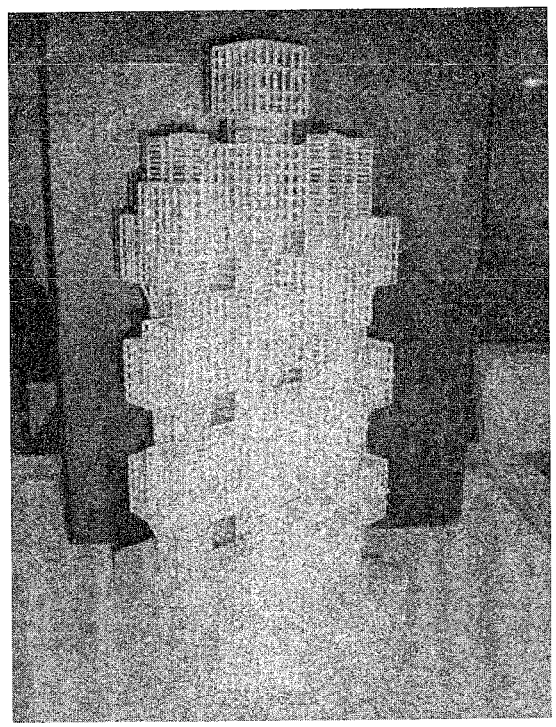

FIG. 9A is sample illustration of a digital model solid model 910, which was provided as an input to system 200 (FIG. 2), then processed by means of said system 200 and printed by means of 3D printer 220 (FIG. 2), giving rise to a physical solid model 920 shown on FIG. 9B, according to an embodiment of the present invention. It should be noted that this digital model solid model 910 is an architectural structure designed by Geotectura®, an award-winning architectural studio founded by the architect Dr. Joseph (Yossi) Cory. FIG. 9B is a snapshot of the screen taken by a software tool that rendered the digital model onto the screen; the rendering tool projects the 3D data that comprises the digital model onto the 2D screen.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A computerized method of transforming an inconsistent 3D (three-dimensional) model of one or more 3D objects into a valid printable 3D model, said method comprising:
   a) receiving at least one of a computerized input model file and computerized modeler data, giving rise to a computerized input 3D model having one or more parts;
   b) using a processor for analyzing said input 3D model and removing said input 3D model's one or more inconsistencies;
   c) using a processor for thickening the one or more parts of said 3D model, while preserving functionality of said one or more parts; and
   d) using a processor for unifying the union of interior volumes of said one or more parts, thereby removing at least one of self-intersections and intersections between the two or more parts, giving rise to a valid printable 3D model, wherein the thickening further comprises:
determining whether the 3D model has convex sub-parts, and if not, decomposing parts of said 3D model into said convex sub-parts;
computing the width of each sub-part; and
thickening corresponding sub-parts, the vertical widths of which are smaller than a first predefined value, along the vertical direction, and thickening corresponding sub-parts, the horizontal widths of which are smaller than a second predefined value, along the horizontal direction.

2. The method according to claim 1, further comprising importing at least one of the input model file and the modeler data.

3. The method according to claim 2, wherein the importing further comprises one or more of the following:
a) parsing the input model file; and
b) obtaining the modeler data from a modeling application.

4. The method according to claim 1, further comprising scaling or clipping the 3D model according to one or more predefined criterions.

5. The method according to claim 4, wherein the scaling is performed automatically to fix a bounding box defined by a 3D printer.

6. The method according to claim 4, wherein the scaling is performed manually based on a user-provided predefined scale factor.

7. The method according to claim 1, further comprising controlling each step of said method by means of a viewer with a GUI (Graphical User Interface).

8. The method according to claim 1, further comprising modifying the 3D model based on a physical analysis for connecting two or more disconnected model parts and forming a singly-connected 3D model.

9. The method according to claim 1, further comprising dividing the 3D model into one or more separated sub-models.

10. The method according to claim 9, further comprising selecting at least one separated sub-model to be printed substantially independently.

11. The method according to claim 1, further comprising removing one or more singularities from the 3D model.

12. The method according to claim 1, wherein the thickening further comprises one or more of the following:
a) vertical thickening; and
b) horizontal thickening.

13. The method according to claim 1 and also comprising using a 3D printer for printing said valid printable 3D model.

14. The method according to claim 1, further comprising exporting the 3D model to be 3D printed.

15. The method according to claim 14, wherein the exporting further comprises one or more of the following:
a) storing the 3D model in an output model file that represents the 3D model in a supported file-format; and
b) sending the 3D model to a 3D printer.

16. The method according to claim 15, wherein the output model file is an STL (stereolithography) file to be used for 3D printing.

17. A computerized system configured to transform an inconsistent 3D (three-dimensional) model of one or more 3D objects into a valid printable 3D model, said system comprising:
a) at least one of a computerized input model file and computerized modeler data provided from a data storage device;
b) a sub-system configured to:
b.1. receive at least one of an input model file and modeler data provided from said data storage device, giving rise to a computerized input 3D model having one or more parts;
b.2. use a processor to analyze said input 3D model and remove said input 3D model's one or more inconsistencies;
b.3. use a processor to thicken the one or more parts of said 3D model, while preserving functionality of said one or more parts; and
b.4. use a processor to unify the union of the interior volumes of said one or more parts, thereby removing at least one of self-intersections and intersections between the two or more parts, thereby giving rise to a valid printable 3D model; and
c) a 3D printer for printing said valid printable 3D model, wherein the thickening further comprises:
determining whether the 3D model has convex sub-parts, and if not, decomposing parts of said 3D model into said convex sub-parts;
computing the width of each sub-part; and
thickening corresponding sub-parts, the vertical widths of which are smaller than a first predefined value, along the vertical direction, and thickening corresponding sub-parts, the horizontal widths of which are smaller than a second predefined value, along the horizontal direction.

18. A program storage device readable by machine, tangibly embodying a program of instructions executable by the machine to perform a method of transforming an inconsistent 3D (three-dimensional) model of one or more 3D objects into a valid printable 3D model, said method comprising:
a) receiving at least one of a computerized input model file and computerized modeler data, giving rise to a computerized input 3D model having one or more parts;
b) using a processor for analyzing said input 3D model and removing said input 3D model's one or more inconsistencies;
c) using a processor for thickening the one or more parts of said 3D model, while preserving functionality of said one or more parts; and
d) using a processor for unifying the union of interior volumes of said one or more parts, thereby removing at least one of self-intersections and intersections between the two or more parts, giving rise to a valid printable 3D model, wherein the thickening further comprises:
determining whether the 3D model has convex sub-parts, and if not, decomposing parts of said 3D model into said convex sub-parts;
computing the width of each sub-part; and
thickening corresponding sub-parts, the vertical widths of which are smaller than a first predefined value, along the vertical direction, and thickening corresponding sub-parts, the horizontal widths of which are smaller than a second predefined value, along the horizontal direction.

19. The program storage device according to claim 18, wherein the method further comprises dividing the 3D model into one or more separated sub-models.

20. The program storage device according to claim 19, wherein the method further comprises selecting at least one separated sub-model to be printed substantially independently.

* * * * *